Patented June 26, 1945

2,379,041

UNITED STATES PATENT OFFICE 2,379,041

HYDROGEN FLUORIDE RECOVERY PROCESS

Walter A. Schulze and William N. Axe, Bartlesville, Okla., assignors to Phillips Petroleum Company, a corporation of Delaware No Drawing. Application December 5, 1942, Serial No. 468,016

9 Claims. (Cl. 23—153)

This invention relates to an improved method for the recovery of hydrogen fluoride. More specifically this invention relates to the recovery of hydrogen fluoride from normally gaseous hydrocarbons and mixtures of normally gaseous hydrocarbons and inert gases. Still more specifically this invention relates to an improved process for the absorption of hydrogen fluoride from a hydrocarbon gas stream followed by subsequent recovery of substantially pure hydrogen fluoride from the absorbent.

Recently it has been discovered that anhydrous hydrogen fluoride possesses unusual catalytic activity with respect to alkylation and isomerization reactions. Hydrogen fluoride in small quantities has also been found to exert a pronounced promotor action on catalysts containing boron fluoride. Hydrogen fluoride can be conveniently recovered from C4 and heavier hydrocarbons by distillation. In reactions where HF is employed as a promotor, as in alkylations catalyzed by boron fluoride hydrate, large loss may result where appreciable quantities of C3 and lighter hydrocarbons have been introduced in the feed streams. The promotor cost in such instances may amount to an appreciable proportion of the total catalyst cost, thus necessitating its recovery and reuse. In any event, complete removal of HF from the light gases is desirable especially when such gases are employed as feed stocks for refinery cracking operations.

Removal of HF from refinery gas streams by the use of aqueous alkaline solutions and the like is ordinarily a relatively simple operation. However, the recovery of HF from such wash solutions is an expensive and involved process requiring special equipment and a considerable consumption of chemicals. Recovery processes of such a conventional nature are in most cases not economically feasible.

One object of our invention is to recover hydrogen fluoride.

It is an object of the present invention to effect efficient and economical recovery of hydrogen fluoride from gaseous hydrocarbon streams. Another object of this invention is to provide a process whereby hydrogen fluoride employed in alkylation reactions can be continuously recovered and recycled to the reaction zone without appreciable loss or consumption of chemicals. These and other objects will be apparent from the accompanying discussion and disclosure.

We have discovered that certain sulfur-containing compounds are capable of forming what appear to be coordination compounds with hydrogen fluoride in the stoichiometric ratio of 1 mol of HF per mol of absorbent. We have also discovered that the complex compounds so formed may be decomposed at moderately elevated temperatures to afford substantially complete recovery of the constituent compounds. The organic sulfur compounds of this invention may be selected from a group corresponding to the following type formula:

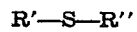

where R' may be either an alkyl or aryl radical with or without substituents other than hydrogen and R" may be hydrogen or an alkyl radical with or without substituents other than hydrogen. The compound, or compounds, used should either be liquid at the absorption temperature or soluble in substantial amounts in suitable liquid material, such as a hydrocarbon fraction. Generally it will be satisfactory to use a compound in which neither R' nor R" contains more than about seven carbon atoms.

We have discovered that alkyl sulfides and mercaptans enter into a loose chemical combination with hydrogen fluoride at moderate temperatures, such as about 40 to about 100° F. Complete saturation of said sulfur compounds at atmospheric pressure with anhydrous hydrogen fluoride results in the absorption of one mol of HF per mol of aforementioned sulfides and mercaptans. The hydrogen fluoride addition compounds, so prepared, can be decomposed by the simple application of heat. Ordinarily complete decomposition into the constituent compounds is realized at temperatures of about 150 to about 300° F., although variations from and within these limits may occur depending on the particular organic sulfur compound employed, the pressure and the degree of saturation of the absorbent liquid.

The hydrogen fluoride recovery process of this invention is particularly adaptable to alkylation processes and even more particularly to isomerization reactions in which HF is employed as a catalyst or catalyst promotor. If the operation of such processes appreciable quantities of methane, ethane, propane and fixed gases may be present in the feed stocks or reaction products. Operations subsequent to the reaction in which these light gas components must be removed require a treating method in order to remove hydrogen fluoride. In the present process, the overhead light gases may be contacted in a suitable, often counter current, operation with a selected alkyl sulfide or mercaptan. Hydrogen fluoride is subsequently removed from the absorber liquid in a stripping column operated at a temperature level sufficient to effect decomposition of the hydrogen fluoride complex at a satisfactory rate. The free gaseous HF is then separately condensed and returned to the reaction zone.

Absorbents found to be particularly applicable in removing hydrogen fluoride according to this process have been the alkyl sulfides and mercaptans. Representative examples of such compounds include the following: ethyl sulfide, n-propyl sulfide, iso-propyl sulfide, n-butyl sulfide, n-amyl sulfide, n-butyl mercaptan, amyl mercaptans and benzyl mercaptan. These compounds readily combine with one molecular proportion of hydrogen fluoride which may, in a subsequent operation, be substantially completely regenerated at or below the boiling temperature of the absorbent. In the case of the higher sulfides and mercaptans, complete decomposition of the complex at atmospheric pressure can be obtained at temperatures below about 250° F. In most instances, however, temperatures of about 150–220° F. are adequate for decomposition of the complex.

Although it is advantageous to operate the HF recovery process with relatively pure compounds, mixtures of high and low molecular weight sulfides and/or mercaptans may be satisfactorily employed. While the absorbents may contain relatively inert impurities or diluents, it is preferred to employ compounds or mixtures relatively free of alcoholic impurities.

In operation of this process, complete stoichiometric saturation of the sulfide and/or mercaptan absorbents is not necessary and in many instances may be undesirable. Conventional operating principles governing the use of selective absorbents may usually be applied with advantage in the present process, in the light of the present teachings, as will be readily apparent to one skilled in the art.

Absorber pressures are chosen in accordance with the composition of the gas stream. For streams rich in $C_3$ hydrocarbons, the pressure may vary from atmospheric to about 100 pounds gage while for streams rich in methane and ethane pressures as high as 500 pounds gage may be employed. In order to prevent excessive accumulation of hydrocarbons in the sulfide or mercaptan absorbent, gas-liquid contacting is preferred and pressures are necessarily regulated to maintain this condition. Because of the relatively low vapor pressure of hydrogen fluoride, atmospheric or low superatmospheric pressure is usually maintained in the stripping operation.

As an example of the operation of our invention, normal butyl sulfide was saturated with hydrogen fluoride by passing a gas comprising hydrogen fluoride into contact with liquid butyl sulfide at about 70° F. Approximately one mol of hydrogen fluoride was absorbed per mol of butyl sulfide, giving a reddish liquid. The resulting complex was heated to about 200° F. and about 95 weight per cent of the hydrogen fluoride was recovered. The steps of absorption and recovery of hydrogen fluoride were repeated several times with substantially complete recovery of hydrogen fluoride.

It is not intended that the invention be limited to any theories as to the operation of the invention nor to any of the examples which have been presented for the sake of illustration. Various modifications can be practiced without departing from the spirit of the disclosure or from the scope of the claims.

We claim:

1. A process for recovering hydrogen fluoride from a gaseous mixture containing the same, which comprises passing such a gaseous mixture into contact with a liquid comprising an organic compound of the type R'—S—R" where R' is one of the group consisting of alkyl and aryl radicals and R" is one of the group consisting of hydrogen and alkyl radicals.

2. A process which comprises reacting hydrogen fluoride with a butyl sulfide.

3. A process for removing hydrogen fluoride from admixture with low-boiling hydrocarbons, which comprises passing such a mixture as a gas and at a temperature between about 40 and about 100° F. into contact with a liquid comprising a liquid sulfur compound of the type R'—S—R" where R' is one of the group consisting of alkyl and aryl radicals and R" is one of the group consisting of hydrogen and alkyl radicals.

4. A process for recovering hydrogen fluoride in concentrated form from a gaseous mixture containing hydrogen fluoride and substantial amounts of other components, which comprises passing such a mixture into contact with a liquid comprising a sulfur compound of the type R'—S—R" where R' is one of the group consisting of alkyl and aryl radicals and R" is one of the group consisting of hydrogen and alkyl radicals, whereby a complex of said compound and hydrogen fluoride is formed, removing the resulting rich liquid absorbent to a stripping zone, heating said rich liquid absorbent in said stripping zone to a temperature sufficient to decompose said complex thus forming hydrogen fluoride, and recovering hydrogen fluoride from said stripping zone.

5. A composition of matter comprising the complex resulting from reacting hydrogen fluoride with an equimolar quantity of a butyl sulfide.

6. A process which comprises reacting hydrogen fluoride with an organic compound of the type R'—S—R" where R' is one of the group consisting of alkyl and aryl radicals and R" is one of the group consisting of hydrogen and alkyl radicals.

7. The process of claim 6 in which each said alkyl and aryl radical contains not more than seven carbon atoms.

8. A process which comprises reacting hydrogen fluoride with an organic compound of the type R'—S—R' where R' is an alkyl radical.

9. A process which comprises reacting hydrogen fluoride with an organic compound of the type R'—SH where R' is one of the group consisting of alkyl and aryl radicals.

WALTER A. SCHULZE.
WILLIAM N. AXE.